US009641793B1

(12) United States Patent
Hope et al.

(10) Patent No.: US 9,641,793 B1
(45) Date of Patent: May 2, 2017

(54) SYSTEM AND METHOD FOR DUAL RECORDING INTEGRATION AND COMBINED FILE SHARING

(71) Applicants: Darrin Hope, Germantown, TN (US); Joshua Travis, Covington, TN (US)

(72) Inventors: Darrin Hope, Germantown, TN (US); Joshua Travis, Covington, TN (US)

(*) Notice: Subject to any disclaimer, the term of this patent is extended or adjusted under 35 U.S.C. 154(b) by 0 days.

(21) Appl. No.: 14/922,194

(22) Filed: Oct. 26, 2015

(51) Int. Cl.
*H04N 5/91* (2006.01)
*H04L 29/08* (2006.01)
*H04N 5/247* (2006.01)
*H04N 5/77* (2006.01)

(52) U.S. Cl.
CPC ............... *H04N 5/91* (2013.01); *H04L 67/06* (2013.01); *H04N 5/247* (2013.01); *H04N 5/77* (2013.01)

(58) Field of Classification Search
None
See application file for complete search history.

(56) References Cited

U.S. PATENT DOCUMENTS

| 6,567,984 | B1 | 5/2003 | Allport |
| 7,145,603 | B2 | 12/2006 | Whitby et al. |
| 7,158,175 | B2 | 1/2007 | Belz et al. |
| 7,295,244 | B2 | 11/2007 | Manico et al. |
| 8,805,431 | B2 | 8/2014 | Vasavada et al. |
| 2009/0189981 | A1 | 7/2009 | Siann et al. |
| 2011/0096168 | A1 | 4/2011 | Siann et al. |
| 2014/0071279 | A1 | 3/2014 | Mokashi et al. |
| 2015/0109441 | A1 | 4/2015 | Fujioka |
| 2015/0154452 | A1 | 6/2015 | Bentley et al. |
| 2016/0046298 | A1* | 2/2016 | DeRuyck .............. B60W 40/09 340/576 |
| 2016/0110208 | A1* | 4/2016 | Wagner ............... G06F 9/44505 710/8 |
| 2016/0119667 | A1* | 4/2016 | Layson, Jr. ........ H04N 21/6131 386/226 |

FOREIGN PATENT DOCUMENTS

JP 2001028740 A 1/2001

* cited by examiner

*Primary Examiner* — Eileen Adams
(74) *Attorney, Agent, or Firm* — Hulsey, P.C.

(57) ABSTRACT

A system and method for dual recording integration, more specifically a system and method for integrating multiple recording devices are provided. Such devices would include a mounted video/audio device (such as within and/or on a vehicle dashboard) and a hand-held or otherwise attached video/audio device (such as a free body camera). The mounted device includes an opening for insertion of the hand-held device in order to provide both a means to charge the hand-held device as well as to download video/audio files from the mounted device thereto. The hand-held device may then be carried to an established storage system for complete transfer of both sets of recorded video/audio files from the two devices. The overall system utilizing firmware for such a result, as well as the two hardware devices themselves, are encompassed within this invention.

4 Claims, 4 Drawing Sheets

SYSTEM AND METHOD FOR DUAL RECORDING INTEGRATION AND COMBINED FILE SHARING

FIELD OF THE INVENTION

The present disclosure relates to a system and method for dual recording integration, more specifically a system and method for integrating multiple recording devices. Such devices would include a mounted video/audio device (such as within and/or on a vehicle dashboard) and a hand-held or otherwise attached video/audio device (such as a free body camera). The mounted device includes an opening for insertion of the hand-held device in order to provide both a means to charge the hand-held device as well as to download video/audio files from the mounted device thereto. The hand-held device may then be carried to an established storage system for complete transfer of both sets of recorded video/audio files from the two devices. The overall system utilizing firmware for such a result, as well as the two hardware devices themselves, are encompassed within this invention.

BACKGROUND OF THE INVENTION

Recent incidents involving police officers and individuals suspected of a crime have spurred a need for police officers to include wearable recording devices with their daily attire. In conjunction with a dash cam, the two devices may be able to capture vital information that may aid in potential court cases down the road.

The utilization of multiple recording devices is currently a standard in the law enforcement sector. The fact that the two recording devices are not compatible or integrated with one another creates problems for users of both devices. These problems may include time loss, file loss, and file disorganization, as well as the potential for file corruption of a mounted dash cam left unattended with files stored therein.

Of particular concern is the ability to facilitate a reliable and safe transfer of such recorded files to a single server or host computer (of any type, whether cloud-based, as a central server, and the like). Currently, the industry utilizes such separate devices, one worn by an officer and the other mounted within a vehicle in a location that allows for a view of a certain scene in front thereof. The placement on and/or within a dashboard allows such a perspective as well as protection from the elements, if needed. If a situation arises wherein an officer (or officers) stops a suspect or other person (such as a speeder, driver with outward vehicle problems, etc.) and parks behind a parked vehicle, the perspective of the dashboard camera is important in order to show the actions and other specifics pertaining to such a snapshot in time and possibly coupled with the filmed events from the officer's body cam. The inclusion of body camera devices allows for a different standpoint than the dashboard mounted camera, ostensibly to provide a wider range of perspectives of the situation itself, both in terms of protecting not only the officer, but also the other party involved.

The main problem with such a situation is, as alluded to above, the reliable transfers of such video/audio files from the devices in question to a storage server (or like computerized vault of information). Each device is typically handled separately in this manner, requiring either a wireless protocol for both at different times, or a hard-wire transfer of the files from the actual device to a central location (police substation, for example) (and thus the potential need to remove a mounted dash cam for transport to such a server location). Additionally, the files recorded and initially stored within the mounted camera (dashboard, for instance) remain therein for a certain period of time until they can be properly transferred; in the meantime, other files may be stored that are difficult to separate (at least in terms of distinguishing from another file or files present therein). Additionally, the hand-held device (body camera, for instance) itself is typically battery-powered and requires recharging on occasion for proper and reliable functioning. The typical vehicle configuration for such a body camera device includes a charging cord (to a charging dock, either within the vehicle or integrated within an on-board computer). Such a situation, though, requires removal of the camera from the officer and placement within the vehicle in an area that may not be configured for such a situation. In other words, the potential for losing track of such a hand-held device is relatively easy in such a situation, leaving a desire for an improved charge activity (at least in terms of facilitating overall implementation of the hand-held device quickly when needed after or possibly during a charging event).

To date, however, there has been lacking any such system, method, or device configuration advancements to meet these delineated needs.

ADVANTAGES AND BRIEF SUMMARY OF THE INVENTION

An advantage of the present disclosure is the ability to have two distinct recording devices and media that may be connected together for file transfer and electrical charging purposes. Another advantage thereof is the ability to connect a hand-held camera (such as a body camera, for instance) to a mounted camera (such as a dashboard camera) and utilize firmware to transfer recorded files from the mounted camera to the hand-held camera and then remove the hand-held camera with all recorded files from both devices and transport such a device to a central computer storage location for file uploading thereto. Yet another advantage is the ability to utilize the mounted camera as a charging station (whether when connected together, such as through insertion thereof within an appropriately configured cavity within the mounted device, or through a USB port and cord operation).

Accordingly, this invention encompasses a system for recording and uploading of files, the system comprising: a first recording unit comprising a first digital computing device, a first microphone acoustic input, a first video recording input, and a male transfer unit, the microphone acoustic input and the video recording input linked to the first digital computing device, the first digital computing device linked to the male transfer unit; a second recording unit comprising a first digital computing device, a second microphone acoustic input, a second video recording input, and a female receiver unit, the microphone acoustic input and the video recording input linked to the second digital computing device, the second digital computing device linked to the female receiver unit; a file transfer module storable on the first and second digital computing devices, the file transfer module operable to: receive and store a first recording on the first digital computing device, the recording comprising at least one of audio files and video files; receive and store a second recording on the second digital computing device, the recording comprising at least one of audio files and video files; send instructions to the first digital computing device to transfer the first recording to the male transfer unit; send instructions to the female receiver unit to transfer the first recording to the second digital computing device; and send the first recording and a second recording from the second digital computing device to a central server. A mounted camera component having an appropriately configured cavity for insertion of at least a portion of a hand-held camera component of such a system, and further including at least complementary configured connection means und electronic file transfer means on the surfaces thereof both camera components, as well as firmware present therein to effectuate transfer of recorded video and/or audio files from the mounted camera component to the handle camera component upon insertion thereof, is also encompassed herein. The extra configuration of the present of a proper charging device within the cavity of the mounted camera component and a complementary charging receiver within and/or on the hand-held camera component, to permit electrical charging of the hand-held camera component while inserted therein the mounted camera component is also encompassed herein.

The disclosure may provide a system for dual recording integration. The system may be utilized by police officers to seamlessly upload recorded content to a central server from multiple devices by means of a single, seamless device. The system may comprise a first recording unit comprising a first digital computing device, a first microphone acoustic input, a first video recording input, and a male transfer unit. The first recording unit may utilize the first microphone acoustic input and the first video recording input to capture and record at least one of audio and video. In embodiments, the first microphone acoustic input and the first video recording input may be linked to the first digital computing device. This may allow the recording to be stored within a memory of the first digital computing device. In embodiments, the first digital computing device may be linked to the male transfer unit.

The system may further comprise a second recording unit comprising a first digital computing device, a second microphone acoustic input, a second video recording input, and a female receiver unit. The second recording unit may utilize the second microphone acoustic input and the second video recording input to capture and record at least one of audio and video. In embodiments, the second microphone acoustic input and the second video recording input may be linked to the second digital computing device. This may allow the recordings to be stored within a memory of the second digital computing device. In embodiments, the second digital computing device linked to the female receiver unit.

The system may further comprise a file transfer module storable on the first and second digital computing devices, the file transfer module may be operable to perform steps to allow the seamless exchange of audio and video files from the first digital recording device to the second digital recording device.

BRIEF DESCRIPTION OF THE DRAWINGS

The novel features believed characteristic of the disclosed subject matter will be set forth in any claims that are filed now and/or later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE ILLUSTRATIVE EMBODIMENTS

Figure 1:
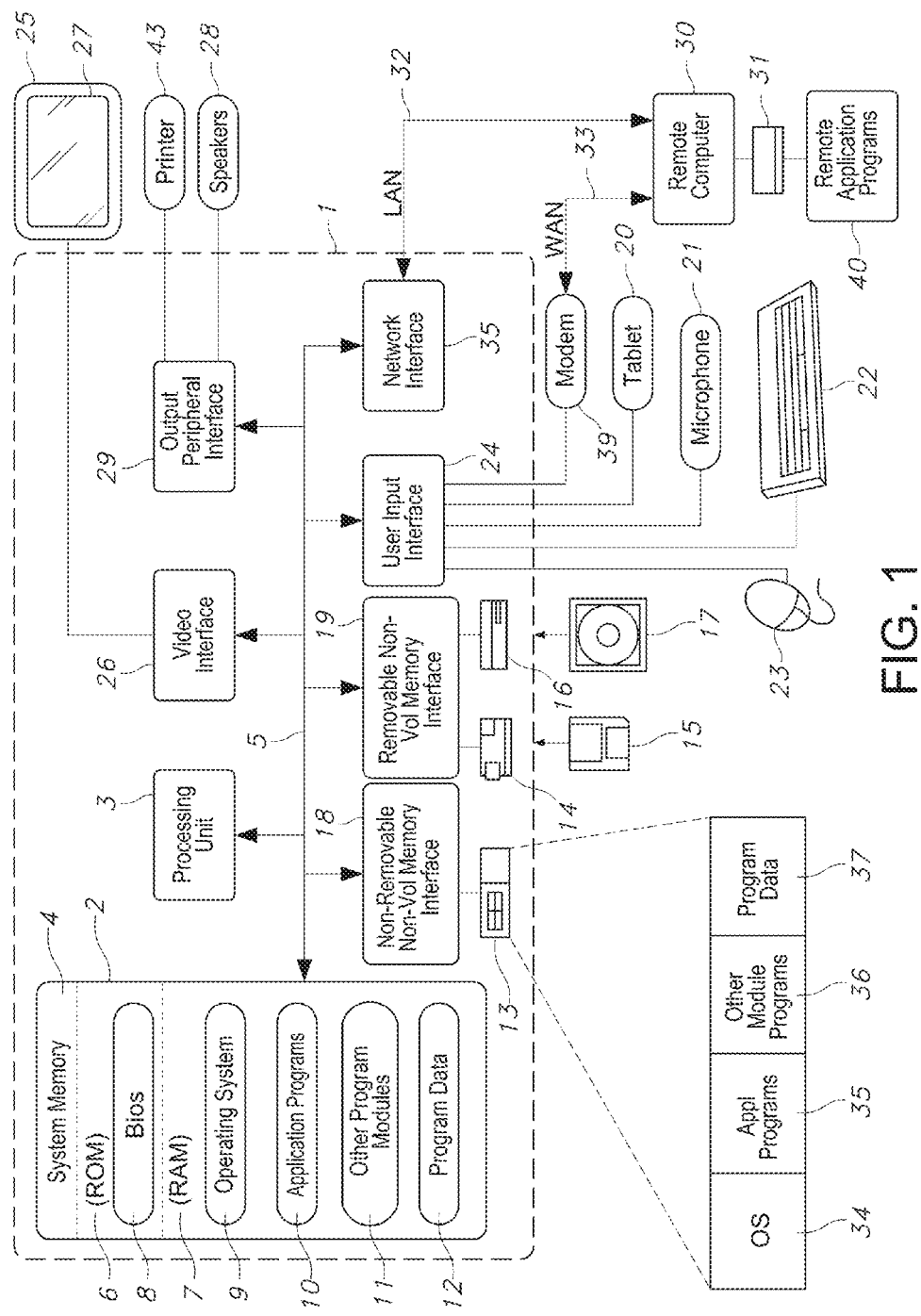
FIG. 1 displays a computing system and related peripherals that may operate in terms of downloading of video/audio files with the method and system for dual recording integration in accordance with embodiments.

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although described with reference to personal computers and the Internet, one skilled in the art could apply the principles discussed herein to any computing or mobile computing environment. Further, one skilled in the art could apply the principles discussed herein to communication mediums beyond the Internet.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

With reference to FIG. 1, an exemplary system within a computing environment for implementing the disclosure includes a general purpose computing device in the form of a computing system 1, commercially available from, for example, Intel, IBM, AMD, Motorola, Cyrix, etc. Components of the computing system 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, or a local bus using any of a variety of bus architectures. Such a system may be utilized in conjunction with the dual recording system and method as the location for shared video/audio files therefrom.

Computing system 1 typically includes a variety of computer readable media. Computer readable media can be any available media that can be accessed by the computing system 1 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 1.

The system memory 4 includes computer storage media in the form of volatile and/or nonvolatile memory such as read only memory (ROM) 6 and random access memory (RAM) 7. A basic input/output system (BIOS) 8, containing the basic routines that help to transfer information between elements within computing system 1, such as during start-up, is typically stored in ROM 6. RAM 7 typically contains data and/or program modules that are immediately accessible to and/or presently being operated on by processing unit 3. By way of example, and not limitation, an operating system 9, application programs 10, other program modules 11, and program data 12 are shown.

Computing system 1 may also include other removable/non-removable, volatile/nonvolatile computer storage media. By way of example only, a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, nonvolatile optical disk 17 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 13 is typically connected to the system bus 5 through a non-removable memory interface such as interface 18, and magnetic disk drive 14 and optical disk drive 16 are typically connected to the system bus 5 by a removable memory interface, such as interface 19.

The drives and their associated computer storage media, discussed above, provide storage of computer readable instructions, data structures, program modules and other data for the computing system 1. For example, hard disk drive 13 is illustrated as storing operating system 34, application programs 35, other program modules 36, and program data 37. Note that these components can either be the same as or different from operating system 9, application programs 10, other program modules 11, and program data 12. Operating system 34, application programs 35, other program modules 36, and program data 37 are given different numbers here to illustrate that, at a minimum, they are different copies.

A user may enter commands and information into the computing system 1 through input devices such as a tablet, or electronic digitizer, 20, a microphone 21, a keyboard 22, and pointing device 23, commonly referred to as a mouse, trackball, or touch pad. These and other input devices are often connected to the processing unit 3 through a user input interface 24 that is coupled to the system bus 5, but may be connected by other interface and bus structures, such as a parallel port, game port or a universal serial bus (USB).

A monitor 25 or other type of display device is also connected to the system bus 5 via an interface, such as a video interface 26. The monitor 25 may also be integrated with a touchscreen panel 27 or the like. Note that the monitor and/or touch screen panel can be physically coupled to a housing in which the computing system 1 is incorporated, such as in a tablet-type personal computer. In addition, computers such as the computing system 1 may also include other peripheral output devices such as speakers 28 and printer 43, which may be connected through an output peripheral interface 29 or the like.

Computing system 1 may operate in a networked environment using logical connections to one or more remote computers, such as a remote computing system 30. The remote computing system 30 may be a personal computer (including, but not limited to, mobile electronic devices), a server, a router, a network PC, a peer device or other common network node, and typically includes many or all of the elements described above relative to the computing system 1, although only a memory storage device 31 has been illustrated. The logical connections depicted include a local area network (LAN) 32 connecting through network interface 38 and a wide area network (WAN) 33 connecting via modem 39, but may also include other networks. Such networking environments are commonplace in offices, enterprise-wide computer networks, intranets, and the Internet.

For example, in the present embodiment, the computer system 1 may comprise the source machine from which data is being generated/transmitted and the remote computing system 30 may comprise the destination machine. Note however that source and destination machines need not be connected by a network or any other means, but instead, data may be transferred via any media capable of being written by the source platform and read by the destination platform or platforms.

In another example, in the present embodiment, the remote computing system 30 may comprise the source machine from which data is being generated/transmitted and the computer system 1 may comprise the destination machine.

In a further embodiment, in the present disclosure, the computing system 1 may comprise both a source machine from which data is being generated/transmitted and a destination machine and the remote computing system 30 may also comprise both a source machine from which data is being generated/transmitted and a destination machine.

Referring to FIG. 1, for the purposes of this disclosure, it will be appreciated that remote computer 30 may include any suitable terms such as, but not limited to "device", "processor based mobile device", "mobile device", "electronic device", "processor based mobile electronic device", "mobile electronic device", "wireless electronic device", "location-capable wireless device," and "remote device" including a smart phone or tablet computer.

The central processor operating pursuant to operating system software such as, but not limited to Apple IOS®, Google Android®, IBM OS/2®, Linux®, UNIX®, Microsoft Windows®, Apple Mac OSX®, and other commercially available operating systems provides functionality for the services provided by the present invention. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation, and algorithm generation. The provided functionality may be embodied directly in hardware, in a software module executed by a processor, or in any combination of the two.

Furthermore, software operations may be executed, in part or wholly, by one or more servers or a client's system, via hardware, software module, or any combination of the two. A software module (program or executable) may reside in RAM memory, flash memory, ROM memory, EPROM memory, EEPROM memory, registers, hard disk, a removable disk, a CD-ROM, DVD, optical disk, or any other form of storage medium known in the art. An exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are well known in the art.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Figure 2:
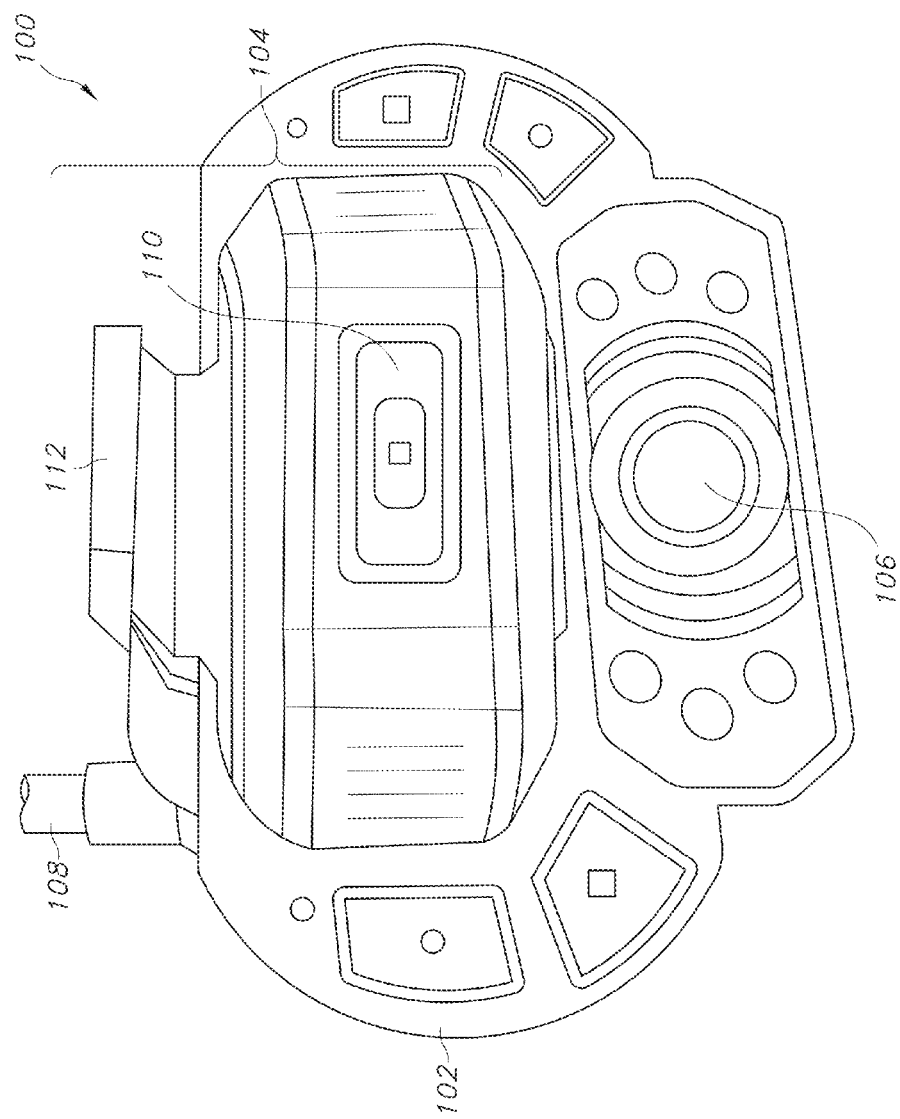
FIG. 2 displays a recording unit system in accordance with embodiments.

FIG. 2 displays a dual recording system in accordance with embodiments.

Figure 3:
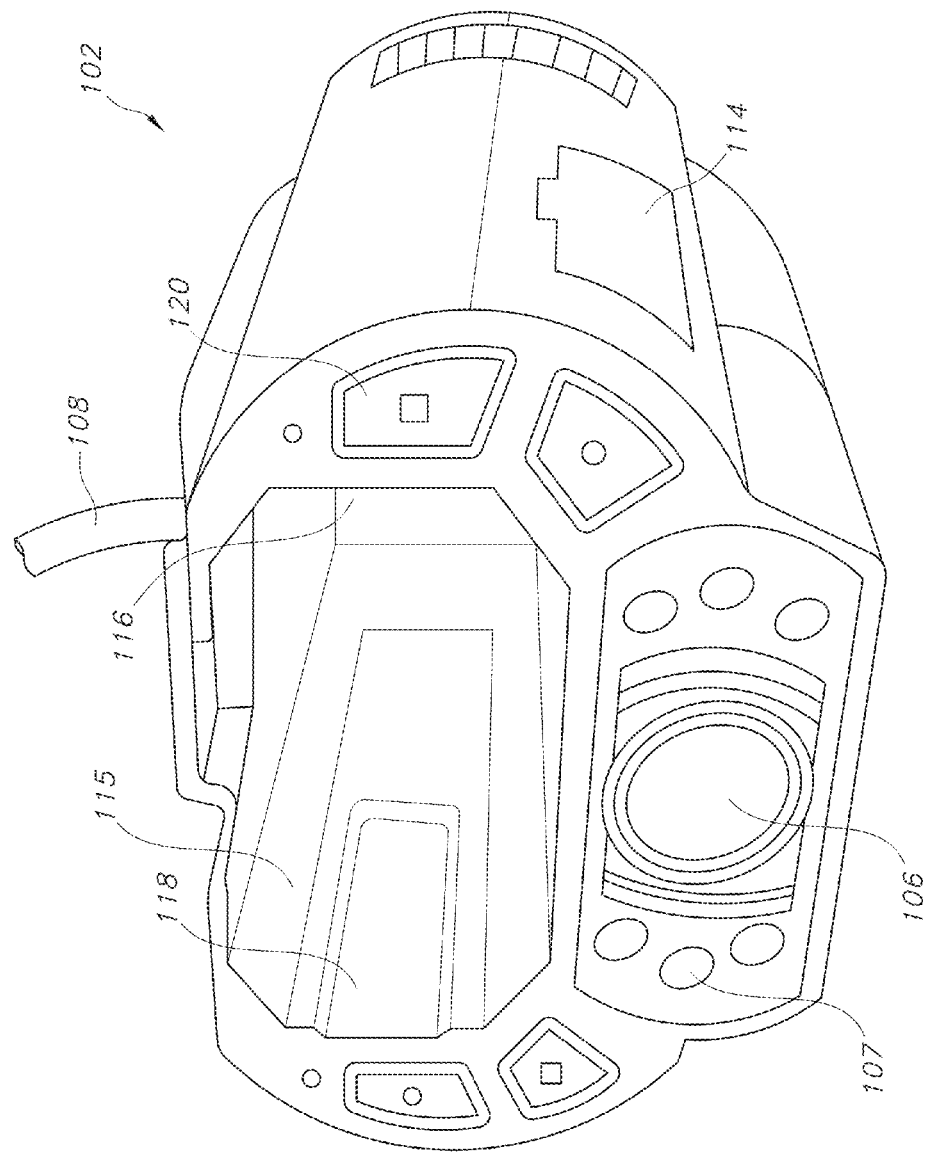
FIG. 3 displays a first mounted recording unit in accordance with embodiments.

FIG. 3 displays a first mounted recording unit in accordance with embodiments.

Figure 4:
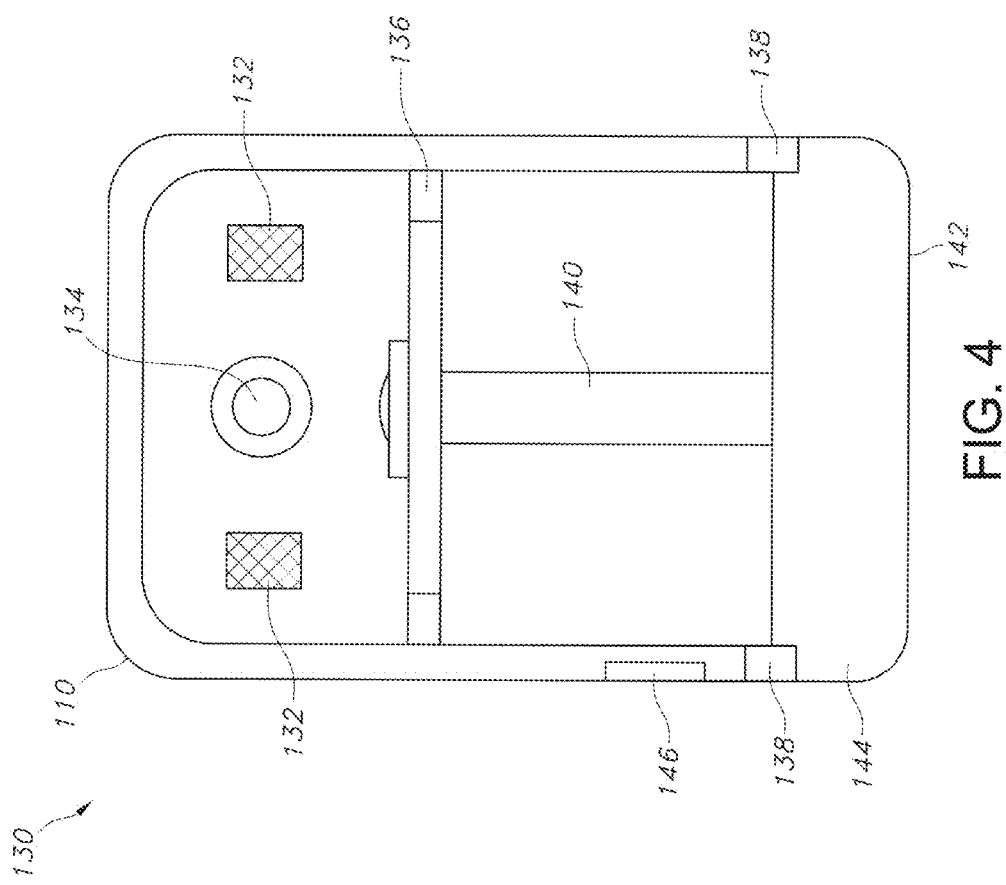
FIG. 4 displays a second hand-held recording unit system in accordance with embodiments.

FIG. 4 displays a second hand-held recording unit system in accordance with embodiments.

In embodiments, the system 100 of FIG. 2 may be utilized by police officers to seamlessly upload recorded content to a central server (such as in FIG. 1) from multiple devices 102, 104 by means of a single, seamless device (100). The system 100 may comprise a second recording unit 104 (also 130 of FIG. 4) comprising a second digital computing device (140 of FIG. 4), a second microphone acoustic input (132 of FIG. 4), a second video recording input (134 of FIG. 4), und a male transfer unit (insertion end 142 of FIG. 4). The second recording unit 104 may utilize the second microphone acoustic input 132 and the second video recording input 134 to capture and record at least one of audio and video. In embodiments, the second microphone acoustic input 132 and the second video recording input 134 may be linked to the second digital computing device 140 (which may further be connected in some fashion, whether wirelessly or through physical connection to the computer storage device as in FIG. 1, for example). This may allow the recordings to be stored within a memory of the digital computing device 140. In embodiments, the digital computing device 140 may be linked to the male transfer unit (second recording unit) 142 (including connections 138 of FIG. 4).

The system 100 may further comprise a first recording unit 102 (FIG. 3) comprising a first digital computing device 120, a first microphone acoustic input 107, a first video recording input 106, and a female receiver unit 115. The first recording unit 102 may utilize the first microphone acoustic input 107 and the first video recording input 106 to capture and record at least one of audio and video. In embodiments, the first microphone acoustic input 107 and the first video recording input 106 may be linked to the first digital computing device 120. This may allow the recordings to be stored within a memory of the first digital computing device 120. In embodiments, the first digital computing device 120 linked to the female receiver unit 115.

The system 100 may further comprise a file transfer module for transfer of files from the first recording device 102 to the second recording device 104 (130 in FIG. 4) through transfer connections 116, 118, 136, and 138, as examples. Such information is thus storable on the first and second digital computing devices, the file transfer module may be operable to perform steps to allow the seamless exchange of audio and video files from the first digital recording device 102 to the second digital recording device 104. Additionally, however, the first recording device includes a USB port 114 for possible connection with an uploading firmware device or, possibly, to remove files without the need of the second recording device 104 (if necessary). Such a USB port 104 also allows for charging externally of the second recording unit 104, if desired. A proper charging cord (not illustrated) may be implemented for such an action. Otherwise, insertion of the second recording device 104 within the female transfer unit 115 of the first recording device 102 will allow for connection of not only the file transfer components 116, 138. Upon removal of the male transfer unit 142 (104) from the female transfer unit 115, the second recording unit 104 may then be transferred to a computer storage system (FIG. 1, for instance) for uploading of the files recorded by both the first and second devices (and the previous files present on the first recording device are removed and the memory is then empty therein). The second recording device 104 can thus also be electrically charged upon insertion within the female transfer unit 115 of the first recording unit 102. If needed, however, the second recording unit battery 144 can be charged via a USB cable in a port 146 connected to the USB port 114 of the first unit 102. The first unit 102 also includes an antenna 108 for signals reception.

For the purposes of this disclosure, the terms "speaker acoustic output" and "speaker" may be synonymous.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What is claimed is:

1. A system for intertwining the recording and uploading of files from a plurality of audio and video devices, each comprising at least one independent storage memory circuit within a secure police vehicle, the system comprising:
- a hand-held or body-worn camera operating as a first recording unit in association with a secure police vehicle and comprising a first digital computing device, a first microphone acoustic input, a first video recording input, and a male transfer unit, the microphone acoustic input and the video recording input linked to the first digital computing device, the first digital computing device linked to the male transfer unit;
- a vehicle-mounted camera system operating as a second recording unit operating within the secure police vehicle and comprising a second digital computing device, a second microphone acoustic input, a second video recording input, a female receiver unit, the microphone acoustic input and the video recording input linked to the second digital computing device, the second digital computing device linked to the female receiver unit;
- a file transfer module storable on the first and second digital computing devices, the file transfer module operable to:
- receive and store a first recording on the first digital computing device, the first recording comprising at least one of audio files and video files,
- and transfer said first recording to said first transfer unit;
- receive and store a second recording on the second digital computing device, the second recording comprising at least one of audio files and video files, and transfer said second recording to said second transfer unit;
- receive and combine selected synchronized data from said first recording and said second recording into a merged recording, said merged recording being stored at a host device comprising at least one of said first digital computing device or said second digital computing device, wherein said merged recording further maintain the information integrity of static identifiers associated uniquely and independently with said first recording and said second recording;
- send said merged recording of said first recording and said second recording to a central server, whereby said merged recording, said first digital computing device, and said second digital computing device provide dual recording integration for said hand-held or body-worn camera and said vehicle-mounted camera system;
- said dual recording integration comprising instructions for reviewing and playing back said first recording, said second recording and said merged recording on said host device within said secure police vehicle and further providing one step download operation for all recordings to a central server location.

2. The system of claim 1, the first recording unit further comprising a transmitter, the transmitter comprising wireless capabilities to transmit files from the first recording unit to the second recording unit.

3. The system of claim 1, the first recording unit comprising a USB port for charging said first recording unit.

4. The system of claim 1, the second recording comprising a circuitry for uploading recordings from both said first recording unit and said second recording unit.

* * * * *